US008874590B2

(12) United States Patent
Suzuki et al.

(10) Patent No.: US 8,874,590 B2
(45) Date of Patent: Oct. 28, 2014

(54) APPARATUS AND METHOD FOR SUPPORTING KEYWORD INPUT

(75) Inventors: Masaru Suzuki, Kawasaki (JP); Satoshi Kinoshita, Tokyo (JP); Hideo Umeki, Yokohama (JP); Wataru Nakano, Kawasaki (JP)

(73) Assignee: Kabushiki Kaisha Toshiba (JP)

( * ) Notice: Subject to any disclaimer, the term of this patent is extended or adjusted under 35 U.S.C. 154(b) by 939 days.

(21) Appl. No.: 12/472,497

(22) Filed: May 27, 2009

(65) Prior Publication Data

US 2009/0300003 A1 Dec. 3, 2009

(30) Foreign Application Priority Data

May 30, 2008 (JP) ................. 2008-143644

(51) Int. Cl.
*G06F 17/30* (2006.01)
*G10L 15/18* (2013.01)

(52) U.S. Cl.
CPC ...... *G10L 15/1822* (2013.01); *G06F 17/30616* (2013.01)
USPC .......................................... 707/750; 704/10

(58) Field of Classification Search
CPC ................................. G06F 17/30616
USPC ..................... 704/1, 9, 10; 707/750
See application file for complete search history.

(56) References Cited

U.S. PATENT DOCUMENTS

2005/0108001 A1* 5/2005 Aarskog .................... 704/10

FOREIGN PATENT DOCUMENTS

| JP | 9-218881 A | 8/1997 |
|----|------------|--------|
| JP | 9-259133 A | 10/1997 |
| JP | 10-134075 A | 5/1998 |
| JP | 10-171821 A | 6/1998 |
| JP | 2001-290840 A | 10/2001 |
| JP | 2002-189734 A | 7/2002 |
| JP | 2004-054619 A | 2/2004 |
| JP | 2004-178421 A | 6/2004 |
| JP | 2005-078338 A | 3/2005 |
| JP | 2005-293213 A | 10/2005 |
| JP | 2006065754 | 3/2006 |
| JP | 2006-113976 A | 4/2006 |
| JP | 2006-127325 A | 5/2006 |

OTHER PUBLICATIONS

Japanese Office Action dated Aug. 21, 2012 from corresponding JP Patent Appln. No. 2008-143644, 11 pages.

(Continued)

*Primary Examiner* — Robert Beausoliel, Jr.
*Assistant Examiner* — Nirav K Khakhar
(74) *Attorney, Agent, or Firm* — Ohlandt, Greeley, Ruggiero & Perle, LLP

(57) ABSTRACT

A keyword input supporting apparatus includes a document acquisition unit that acquires a document having a plurality of components containing text data, a main component selection unit that selects a component having many characters in the text data as a main component, a part-of-speech analysis unit that analyzes the part-of-speech of the text data contained in the main component, and adds a semantic attribute to each of words of the text data, a specific name extraction unit that extracts as a specific name a word, having a predetermined semantic attribute or part of speech, from the words, a specific name storage that stores the specific name together with the corresponding semantic attribute, a keyword candidate classification unit that performs classification of the specific name from the storage as a keyword candidate based on the semantic attribute, and a keyword candidate presentation unit that presents the keyword candidate to a user.

13 Claims, 14 Drawing Sheets

(56) References Cited

OTHER PUBLICATIONS

Uemura, et al.; "Efficient Keyword Extraction and its Applications on Web Browsing"; Symposium on Database and Web Information System, IPSJ Symposium Series, [CD-ROM], Information Processing Society of Japan; Nov. 27, 2007; vol. 2007, No. 3, pp. 1-9.

Nakamura, Tatsuya; "Studies on Detecting Uninformative Blocks from Web Pages"; Proceedings of the 13th Annual Conference of the Association for Natural Language Processing; the Association of Natural Language Processing; Mar. 19, 2007; pp. 234-237.

Ishitani, et al.; "Interactive for Human-interface for Information Retrieval Based on Semantic Pattern Analysis and Intention Understanding"; Proceedings of Information Processing Society of Japan; Dec. 15, 2007; vol. 48; No. 12; pp. 3793-3808.

* cited by examiner

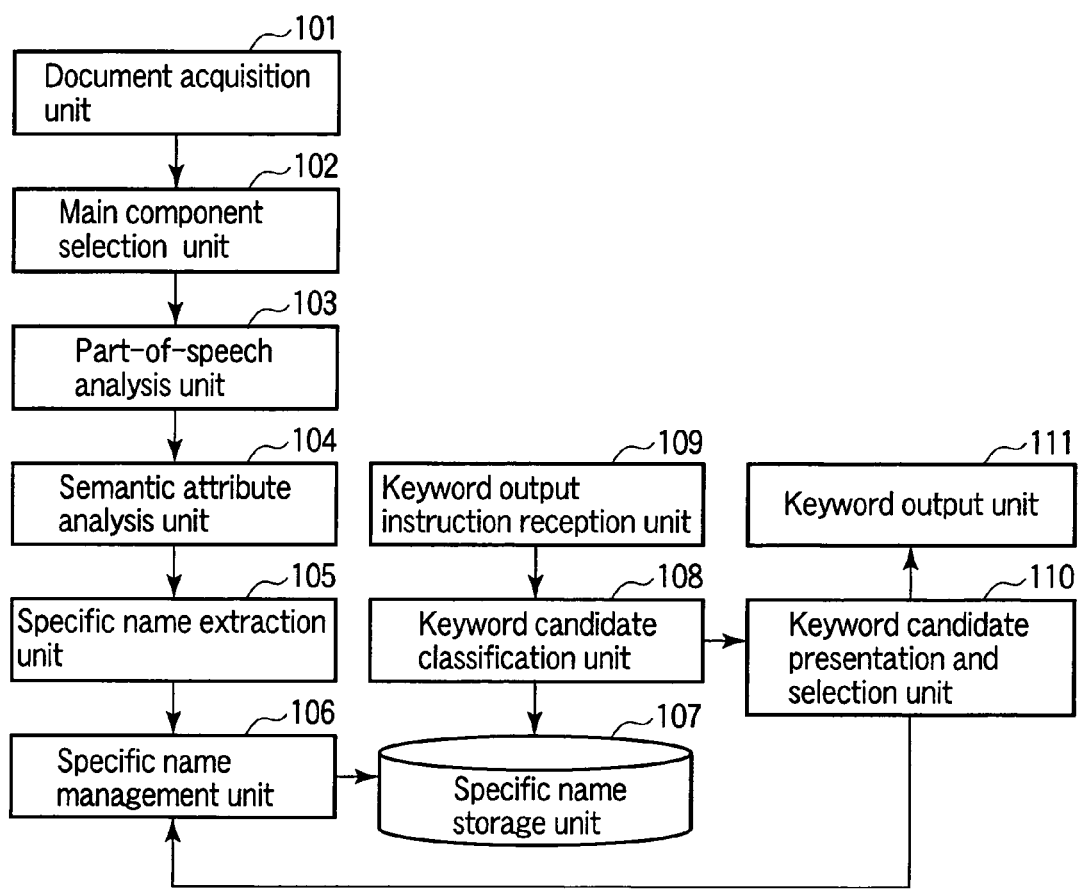
F I G. 1

```
<HTML>
 <HEAD>
  <TITLE>Gurume resutoran joho</TITLE>
 </HEAD>
 <BODY>
  <DIV>                                                          ─── 301
   (Advertisement)
  </DIV>
  <DIV>
   <H1>Gurume resutoran joho</H1>
   <P>
    Daikanyama no wakaki shefu ga hyoban no itaria ryoriten.  Kaunta- 2
    seki, te-buru 8 seki no tennai ha itsumo takusan no okyakusan de
    oonigiwai desu.  Kisetsu no syokuzai wo . . .
   </P>
   <TABLE>
    <TR>
     <TD>Tenmei</TD><TD>La・xxx</TD>                              ─── 302
    </TR>
     <TD>Jusho</TD><TD>Shibuya-ku, Daikanyama-cho, x-x</TD>
    <TR>
     <TD>Denwa</TD><TD>03-3463-xxxx</TD>
    </TR>
    <TR>
     <TD>Moyori eki</TD><TD>Toyoko-sen, Daikanyama eki</TD>
    </TR>
   </TABLE>
  </DIV>
  <DIV>                                                          ─── 303
   <DIV>(Sponsor)</DIV>                                          ─── 304
   <DIV>(Sponsor)</DIV>                                          ─── 305
   <DIV>(Sponsor)</DIV>                                          ─── 306
  </DIV>
 </BODY>
</HTML>
```

FIG. 3 gurume<noun>/ resutoran<noun>/ joho <noun>
daikanyama<location proper noun>+no<particle>/wakaki<adjective>/shefu<noun>+ga<particle>/hyoban<adjective verb>+no<particle>/itaria<location proper noun>/ryoriten<noun>/.<period>/kaunta-<noun>/2<numeral>+seki<noun>/,<comma>/te-buru<noun>/8<numeral>/seki<noun>+no<particle>/tennai<noun>+ha<particle>/itsumo<adverb>/takusan<adjective verb>+no<particle>/okyakusan<noun>+de<particle>/oonigiwai<adjective verb>+desu<auxiliary verb>/.<period>/kisetu<noun>+no<particle>/syokuzai<noun>+wo<particle> . . .
tenmei<noun>/La・xxx<proper noun>
jusho<noun>/shibuya-ku<location proper noun>/daikanyama-cho<location proper noun>/x<numeral>/-<mark>/x<numeral>
denwa<noun>/03<numeral>/-<mark>/3463<numeral>/-<mark>/xxxx<numeral>
moyorieki<noun>/toyoko-sen<proper noun>/daikanyama<location proper noun>+eki<noun>

F I G. 5

| Pattern | Semantic attribute | |
|---|---|---|
| (.+<location proper noun>+[<numeral><mark>]+) | <<address>> | ~601 |
| (.+<location proper noun>+eki)<noun> | <<station name>> | ~602 |
| (.+sen)<proper noun> | <<line name>> | ~603 |
| tenmei<noun>/(.+)<proper noun> | <<store name>> | ~604 |
| denwa<noun>/(.+[<numeral><mark>]+) | <<telephone number>> | ~605 |
| (.+)<location proper noun> | <<location name>> | ~606 |

FIG. 6

```
gurume<noun>/ resutoran<noun>/ joho <noun>
daikanyaka<<location name>>+no<particle>/wakaki<adjective>/shefu<noun>+
ga<particle>/hyoban<adjective verb>+no<particle>/itaria<<location name>>/
ryoriten<noun>/.<period>/kaunta-<noun>/2<numeral>+seki<noun>/, <comma>
/te-buru<noun>/8<numeral>/seki<noun>+no<particle>/tennai<noun>+ha
<particle>/itsumo<adverb>/takusan<adjective verb>+no<particle>/okyakusan
<noun>+de<particle>/oonigiwai<adjective verb>+desu<auxiliary verb>/.<period>
/kisetsu<noun>+no<particle>/syokuzai<noun>+wo<particle> . . .
tenmei<noun>/La・xxx<<store name>>
jusho<noun>/shibuya-ku daikanyama-cho x-x<<address>>
denwa<noun>/03-3463-xxxx<<telephone number>>
moyorieki<noun>/toyoko-sen<<line name>>/daikanyama-eki<<station name>>
```

FIG. 7

| Specific name | Semantic attribute |
|---|---|
| Daikanyama | Location name |
| Itaria | Location name |
| La·xxx | Store name |
| Shibuya-ku, daikanyama-cho, x-x | Address |
| Daikanyama eki | Station name |

FIG. 8

| Specific name | Semantic attribute | Final date and time | Number of selections |
|---|---|---|---|
| Daikanyama eki | Station name | 2007/11/25 13:22 | 3 |
| Daikanyama | Location name | 2007/11/25 13:22 | 2 |
| Itaria | Location name | 2007/11/25 13:22 | 0 |
| La·xxx | Store name | 2007/11/25 13:22 | 0 |
| Shibuya-ku, daikanyama-cho, x-x | Address | 2007/11/25 13:22 | 0 |
| Kawasaki | Location name | 2007/11/22 19:33 | 5 |
| xx ya | Store name | 2007/11/22 19:20 | 1 |
| DV-X100 | Product model number | 2007/11/21 14:36 | 1 |
| ⋮ | ⋮ | ⋮ | ⋮ |

FIG. 9

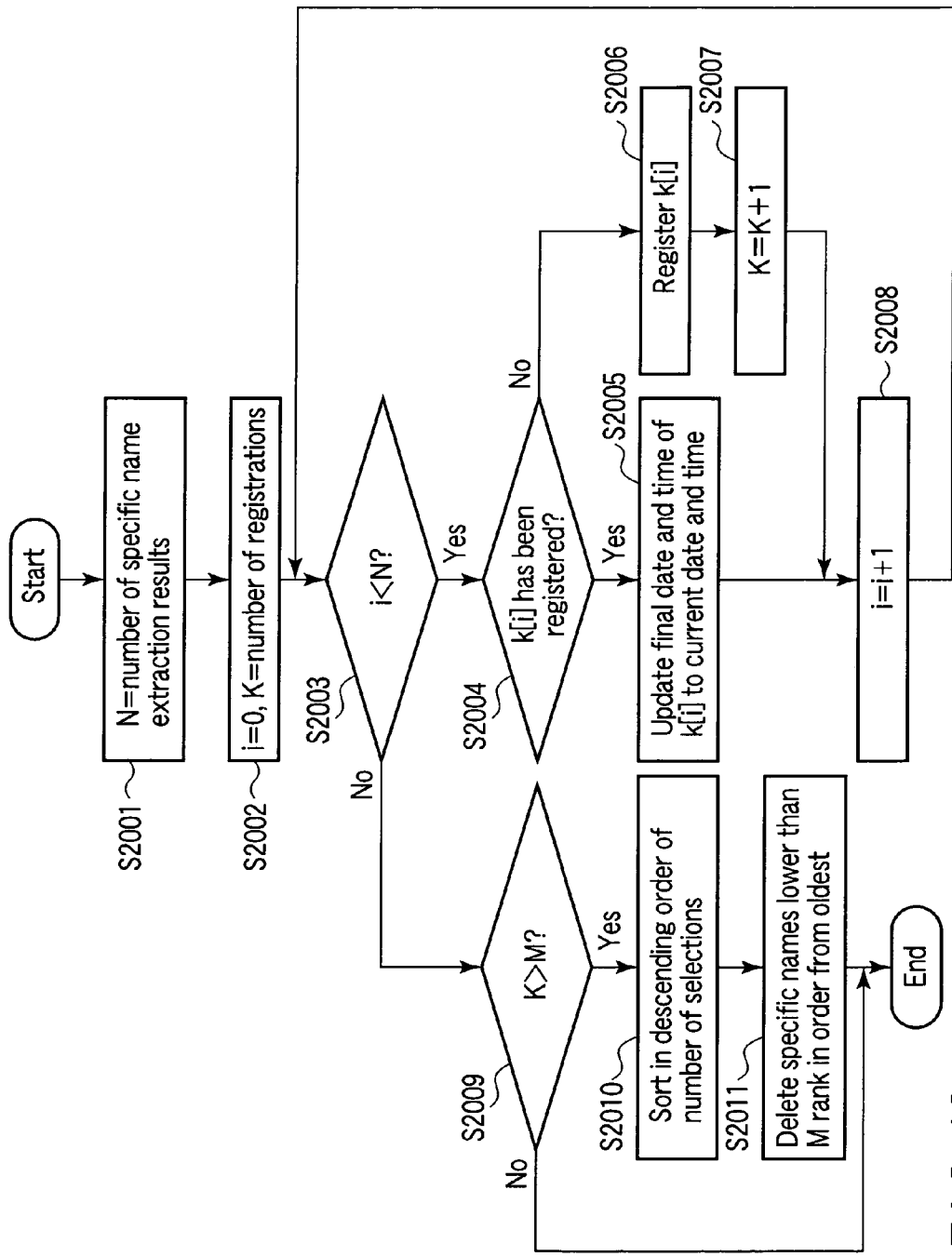
F I G. 10

| Semantic attribute | Search method | Additional keyword |
|---|---|---|
| Station name | Look up timetable | Timetable |
| Station name | Search for premises location map | Location map, floor plan |
| Station name | Search for eating establishment | Restaurant, gourmet |
| Location name | Refer to map | Chart, map |
| Location name | Search for eating establishment | Restaurant, gourmet |
| Personal name | Look up profile | Profile, history |
| ⋮ | ⋮ | ⋮ |

F I G. 12

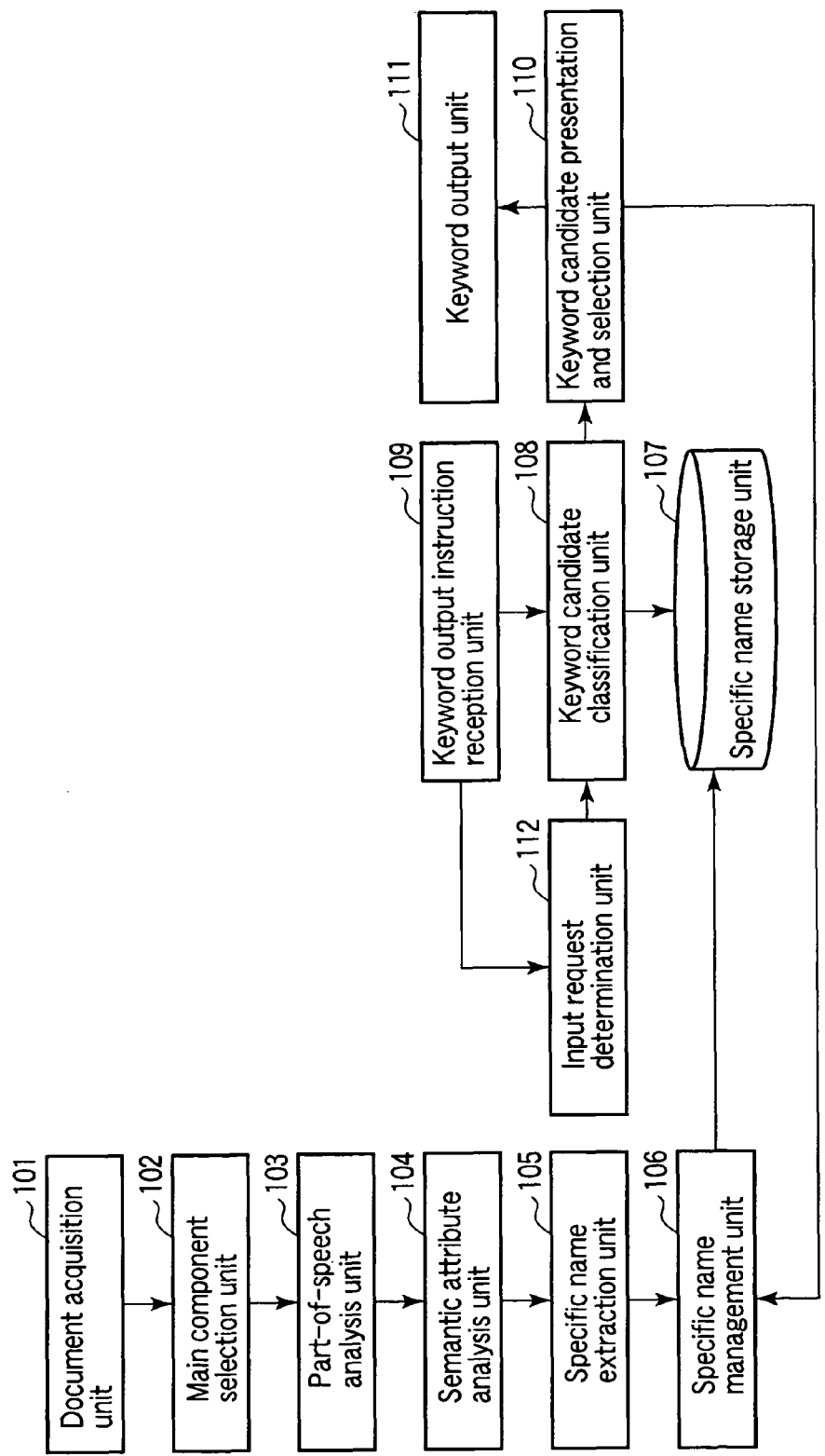
F I G. 14

| Clue word | Classification |
|---|---|
| Jusho (Address) | Location name |
| Moyori eki (Nearest station) | Station name |
| Eki (Station) | Station name |  ~1501
| Chimei (Location name) | Location name |
| Seihin (Product) | Product |
| Seihin (Product) | Product |
| Seihin (Product) | Product |
| : | : |

F I G. 15

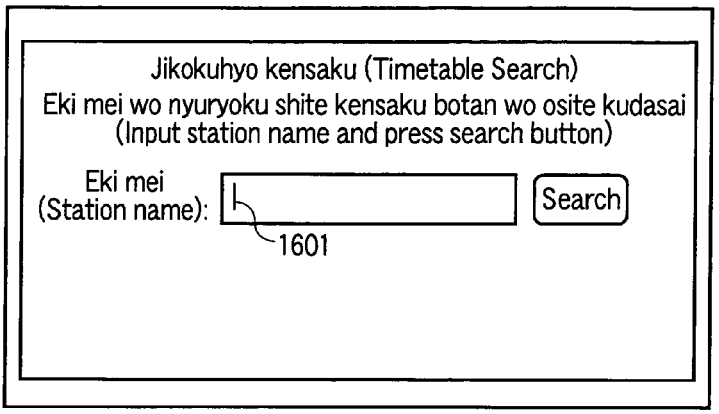
F I G. 16A
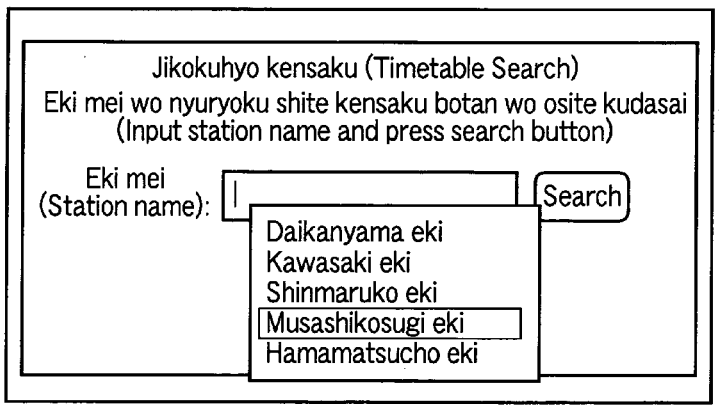
F I G. 16B
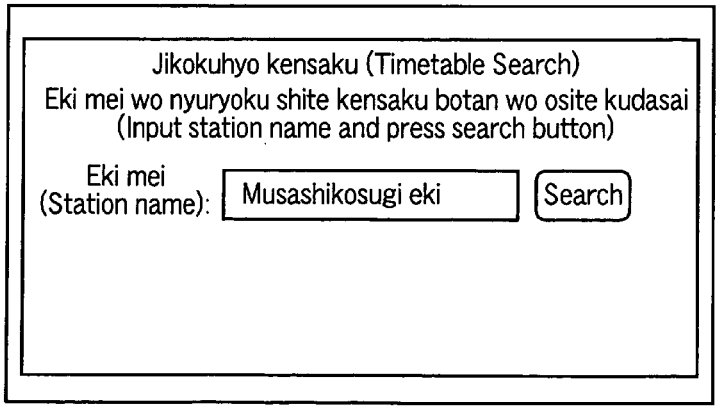
F I G. 16C

US 8,874,590 B2

APPARATUS AND METHOD FOR SUPPORTING KEYWORD INPUT

CROSS-REFERENCE TO RELATED APPLICATIONS

This application is based upon and claims the benefit of priority from prior Japanese Patent Application No. 2008-143644, filed May 30, 2008, the entire contents of which are incorporated herein by reference.

BACKGROUND OF THE INVENTION

1. Field of the Invention

The present invention relates to an apparatus and a method for supporting keyword input when information retrieval and the like are performed.

2. Description of the Related Art

Various methods have been proposed as techniques to retrieve information related to a document that is being viewed. For example, JP-A 2006-65754 (KOKAI) discloses a method in which when a user selects a keyword from a document displayed in a Web browser by using a pointing device, retrieval method candidates related to the keyword are displayed in a menu based on the semantic attribute of the selected keyword, and information is retrieved based on the selected retrieval method. This method enables information related to a document being viewed to be retrieved only by selecting a desired keyword on a screen with a pointing device, such as a mouse.

However, the above method requires that a user select a keyword from a document being viewed with a pointing device upon retrieval. This causes one defect that the method cannot be applied to devices that generally do not have pointing devices, such as cellular phones and television sets. Another defect with the method is that only the information related to a document being viewed can be retrieved, and retrieval using, as keywords, information related to documents viewed in the past cannot be performed.

As described above, since, with the above method, a user needs to select a keyword from a document being viewed with a pointing device upon retrieval, the method has a defect that it cannot be applied to devices that do not have pointing devices, such as cellular phones and television sets.

BRIEF SUMMARY OF THE INVENTION

According to an aspect of the present invention, there is provided a keyword input supporting apparatus including: a document acquisition unit which acquires a document having a plurality of components containing text data; a main component selection unit which selects a component having many characters in the text data among the components as a main component; an analysis unit which analyzes the part-of-speech of the text data contained in the main component, and adds a semantic attribute to each of words of the analyzed text data; an extraction unit which extracts as a specific name a word, having one of a predetermined semantic attribute and a predetermined part of speech, from each of the words; a storage unit which stores the specific name together with a corresponding semantic attribute; a keyword candidate classification unit which performs classification of the specific name from the storage unit as a keyword candidate based on the semantic attribute; and a presentation unit which presents the keyword candidate to a user.

According to another aspect of the present invention, there is provided a keyword input supporting method including: acquiring a document having a plurality of components containing text data; selecting a component having many characters in the text data among the components as a main component; analyzing the part-of-speech of the text data contained in the main component, and adding a semantic attribute to each of words of the analyzed text data; extracting as a specific name a word, having one of a predetermined semantic attribute and a predetermined part of speech, from each of the words; storing the specific name together with a corresponding semantic attribute; performing classification of the stored specific name as a keyword candidate based on the semantic attribute; and presenting the keyword candidate to a user.

According to another aspect of the present invention, there is provided a computer-readable medium storing instructions that, when executed by the computer, cause the computer to perform: acquiring a document having a plurality of components containing text data; selecting a component having many characters in the text data among the components as a main component; analyzing the part-of-speech of the text data contained in the main component, and adding a semantic attribute to each of words of the analyzed text data; extracting as a specific name a word, having one of a predetermined semantic attribute and a predetermined part of speech, from each of the words; storing the specific name together with a corresponding semantic attribute; performing classification of the stored specific name as a keyword candidate based on the semantic attribute; and presenting the keyword candidate to a user.

BRIEF DESCRIPTION OF THE SEVERAL VIEWS OF THE DRAWING

FIG. 1 is a functional block diagram showing the configuration of a keyword input supporting apparatus of a first embodiment;

FIG. 3 shows one example of an HTML document acquired from the screen example of FIG. 2;

FIG. 5 shows one example of a part-of-speech analysis result of the document of FIG. 3;

FIG. 6 shows one example of a semantic attribute analysis knowledge database;

FIG. 7 shows one example of a semantic attribute analysis result;

FIG. 8 shows one example of specific names extracted by a specific name extraction unit;

FIG. 9 shows one example of specific names stored in a specific name storage unit;

FIG. 10 is a flowchart showing the actions of a specific name management unit;

FIG. 12 shows one example of a retrieval method;

FIG. 14 is a functional block diagram showing the configuration of a keyword input supporting apparatus of a second embodiment;

FIG. 15 shows one example of an input request determination knowledge database; and FIGS. 16A to 16C show one example of keyword output.

DETAILED DESCRIPTION OF THE INVENTION

Figure 2:
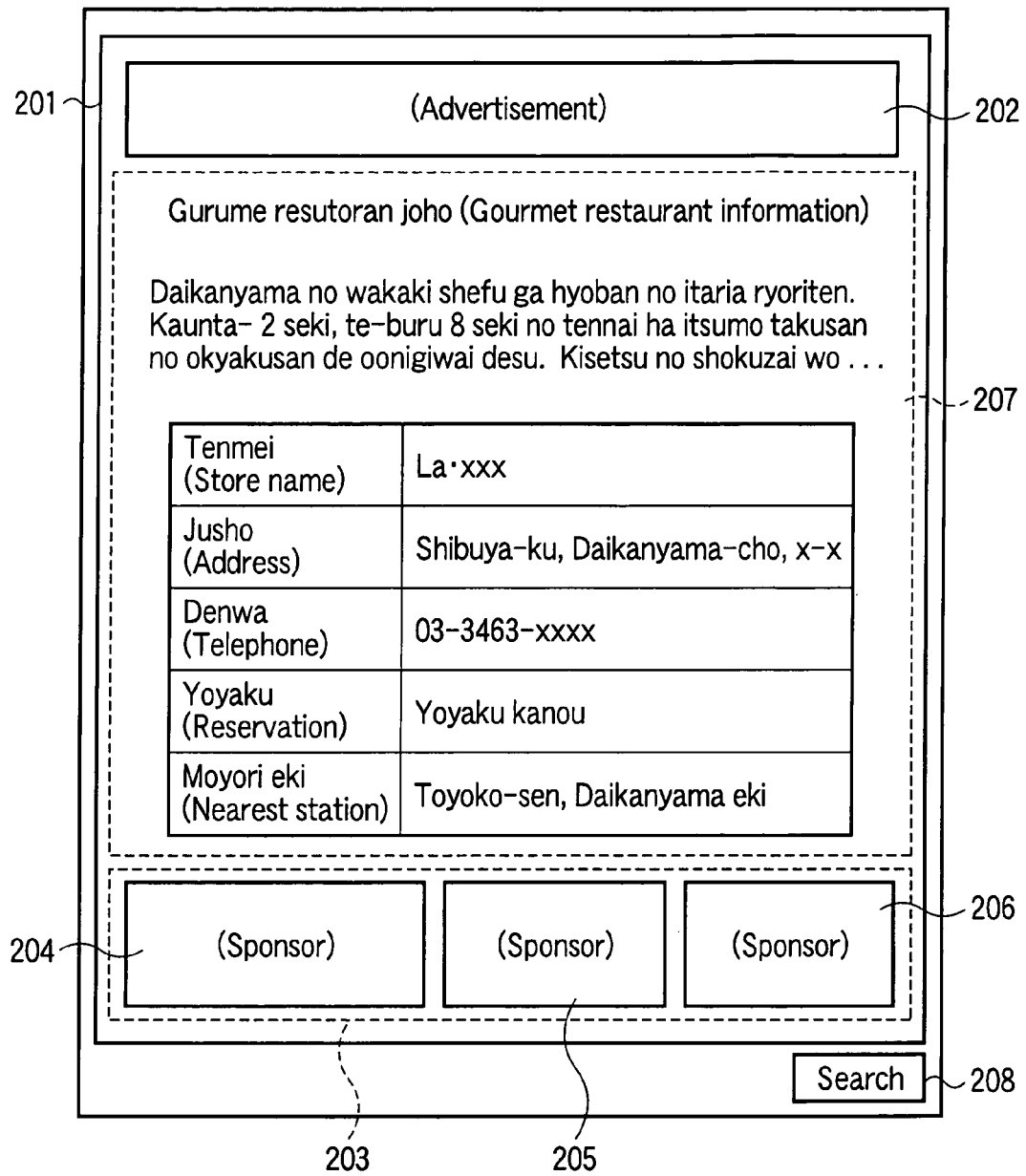
FIG. 2 shows a screen example of a document being viewed.

Embodiments of the present invention will be described in detail below with reference to the accompanying drawings.

First Embodiment

The first embodiment of the present invention describes a keyword input supporting apparatus that is used in order that when a Web page is being viewed on a portable terminal, such as a cellular phone, information related to the document being viewed or documents viewed before is retrieved. Note that, for the sake of concreteness, the present embodiment describes an example in which the keyword input supporting apparatus operates on a portable terminal; however, the type of a device for the operation of the keyword input supporting apparatus need not be restricted. For example, there may be an embodiment in which the keyword input supporting apparatus operates using a television set, a desk-top type personal computer or the like.

FIG. 1 is a functional block diagram showing the configuration of a keyword input supporting apparatus of the first embodiment.

A document acquisition unit 101 acquires text data from a document that a user is viewing in a Web browser or the like. The document is a structured document that has a plurality of components containing text data. In the case of a document in the Hypertext Markup Language (HTML) format or Extensible Markup Language (XML) format, text information containing tag information is acquired.

A main component selection unit 102 selects, among the plurality of components in the structured document, a component in which a central content of the document is described (hereinafter, referred to as a "main component"). A plurality of main components may be selected from a single document.

A part-of-speech analysis unit 103 applies part-of-speech analysis to text data contained in the main component. The part-of-speech analysis divides text data on a word-by-word basis and outputs a determination result of the part of speech of each word.

A semantic attribute analysis unit 104 adds a semantic attribute to each word of the text data contained in the main component based on the result of the above part-of-speech analysis. Possible examples of the added semantic attributes include person names, station names, location names, product names and product models.

A specific name extraction unit 105 extracts specific names corresponding to the above semantic attributes from the main component of the document being viewed based on the analysis result by the semantic attribute analysis unit 104.

A specific name management unit 106 stores the specific names extracted by the specific name extraction unit 105 together with the corresponding semantic attributes in a specific name storage unit 107 to be described later. The specific name management unit 106 also deletes specific names determined to be unnecessary based on predetermined criteria among the specific names stored in the specific name storage unit 107.

The specific name storage unit 107 stores sets of specific names and their semantic attributes. The last date and time at which the specific name is extracted by the specific name extraction unit 105 may be additionally stored if needed for management. Also, the number of times the specific name is selected by a keyword candidate presentation and selection unit 110 to be described later as a keyword by a user may be additionally stored. Various information stored in the specific name storage unit 107 is registered in or deleted from the specific name storage unit 107 by the specific name management unit 106.

A keyword candidate classification unit 108 classifies specific names as keyword candidates based on the semantic attributes when a keyword output instruction reception unit 109 receives an instruction from a user. The classified specific names can be further classified in accordance with predefined criteria, such as the last date and time at which a specific name is extracted by the specific name extraction unit 105, as needed.

The keyword candidate presentation and selection unit 110 presents the keyword candidates classified by the keyword candidate classification unit 108 to a user, and prompts the user to select a desired keyword from the presented keyword candidates.

A keyword output unit 111 outputs a keyword selected by the user through the keyword candidate presentation and selection unit 110 from keyword candidates to a predetermined output destination, such as a search engine.

Note that the specific name storage unit 107 uses a writable and readable memory, such as a RAM (Random Access Memory) or a hard disk, as a storage medium. Each of other modules is stored as a control program to be executed, for example, by a CPU (Central Processing Unit) in a ROM (Read Only Memory) or the like.

Next, the actions of the keyword input supporting apparatus configured in this way will be described.

FIG. 2 shows an example of a screen on which a user views a Web page in the present embodiment. The example of FIG. 2 can be implemented, for example, by a Web browser operating on a portable terminal. FIG. 2 shows a document 201 as a Web page being viewed and a search button 208. The search button 208 is pressed when a user wants to retrieve information related to the document 201 being viewed. That is, the search button 208 is one implementation of the keyword output instruction reception unit 109 shown in FIG. 1. The content of the displayed document is read by the document acquisition unit 101.

FIG. 3 shows one example of an HTML document acquired from the screen example shown in FIG. 2. FIG. 3 shows the Web page displayed in a region 201 in FIG. 2 in the HTML format. The acquired HTML document is processed according to the flow of FIG. 4 by the main component selection unit 102, so that main components are selected from the structure of the HTML document.

Figure 4:
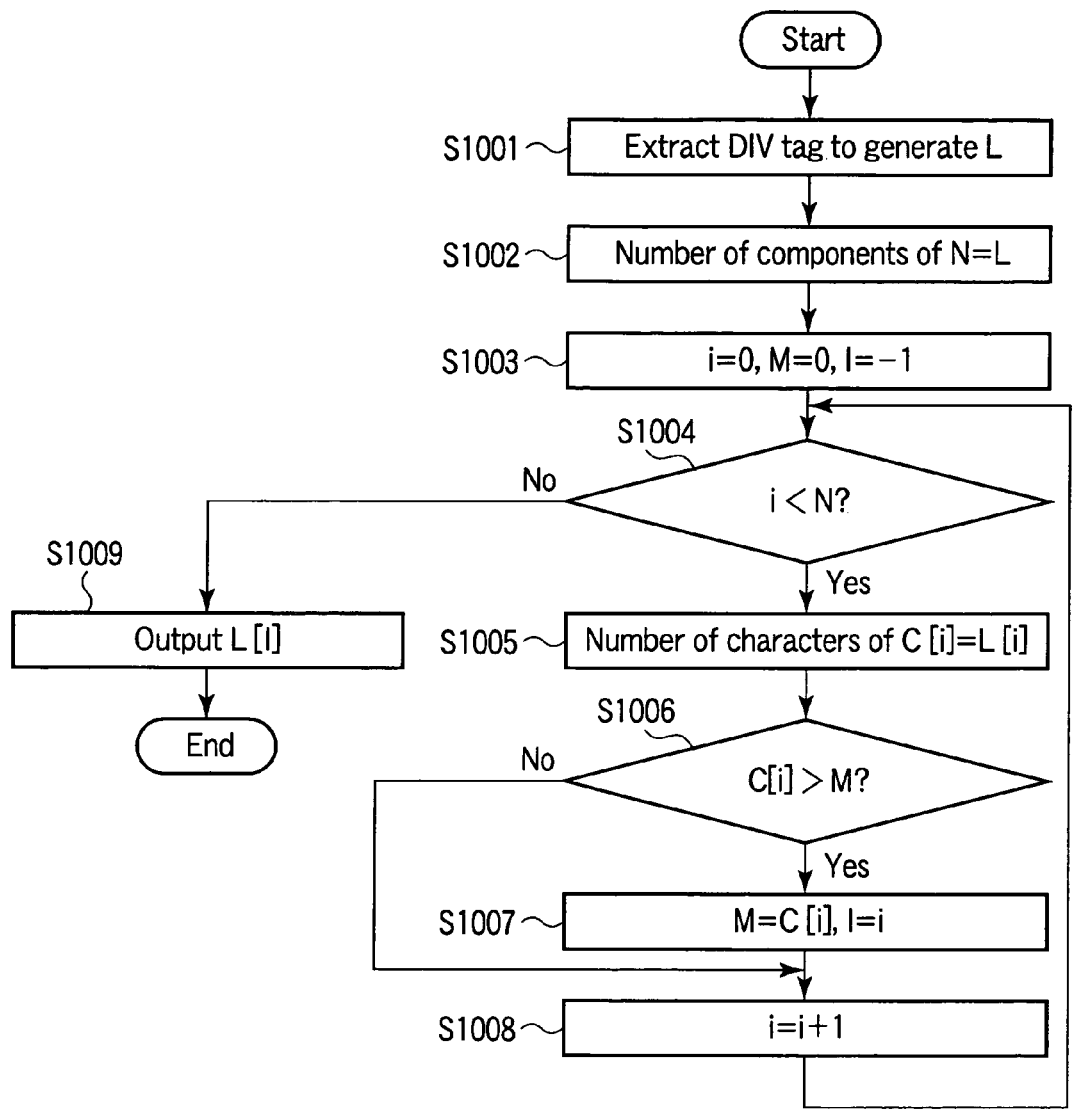
FIG. 4 is a flowchart showing the actions of a main component selection unit.

FIG. 4 is a flowchart showing the actions of the main component selection unit 102.

First, the main component selection unit 102 extracts all DIV tags (<DIV> to </DIV>) from the document structure to generate a list L (S1001). The number of components of the list L is N (S1002). For example, in the HTML document of FIG. 3, components 301 to 306 are extracted, and the number N of components is six (N=6).

The main component selection unit 102 initializes a variable i to zero (i=0), a maximum value M of the number of characters to zero (M=0) and a component I of the maximum value to −1 (I=−1) (S1003). If the variable i is less than the number N of components (S1004: YES), the process shifts to S1005, where the main component selection unit 102 counts the number of characters contained in a DIV tag for the i-th component L[i] of the list L and stores the counted number of characters in the number of characters C[i] (S1005). However, when another DIV tag L[j] is contained in L[i], the number of characters of L[j] is not included in the number of characters C[i].

Next, the main component selection unit 102 compares the number of characters C[i] with the maximum value M of the number of characters. If it is determined that the number of characters C[i] is larger than the maximum value M of the number of characters (S1006: YES), the process shifts to S1007, where the maximum value M of the number of characters is made equal to the number of characters C[i] (M=C[i]) and the component I of the maximum value is made equal to i (I=i) (S1007). On the other hand, if the number of characters C[i] is less than or equal to the maximum value M of the number of characters in the above determination (S1006: NO), the process directly shifts to S1008, where the variable i is increased to i+1 (i=i+1), so that the above process is performed for the next component (returning to S1004).

When the main component selection unit 102 has performed the above process for all components in the list L (S1004: NO), the process shifts to S1009, where L[I] is output as a main component (S1009).

In the case of the HTML document of FIG. 3, a part designated by reference number 302 is selected as the main component in accordance with the above flow of FIG. 4. The component 302 corresponds to the region designated by reference number 207 of FIG. 2, and corresponds to a body of the document being viewed. Components 301, 303, 304, 305 and 306 of FIG. 3 correspond to regions 202, 203, 204, 205 and 206 of FIG. 2, respectively. These components are not selected as main components. That is, the main component selection unit 102 removes an advertisement part and sponsored link parts from the Web page to select a portion corresponding to the body.

Note that only the component L[i] that maximizes the number of characters C[i] is the main component in the flow of FIG. 4; however, a plurality of components L[i] that provide C[i] close to the maximum value may be output as the main components. The processing of the main component selection unit 102 is not limited to counting of the number of characters in each DIV tag. For example, a method of counting the number of punctuation marks contained in each DIV tag to use DIV tags containing more punctuation marks as main components is conceivable.

Subsequently, the part-of-speech analysis unit 103 extracts text data from the main component selected by the main component selection unit 102, and applies part-of-speech analysis to the extracted text data. An example of the result of part-of-speech analysis for the text data extracted from the main component 302 of FIG. 3 is shown in FIG. 5. The action of the part-of-speech analysis unit 103 is a publicly known part-of-speech analysis process, and therefore is not described in detail here. The part-of-speech analysis unit 103 divides text data on a word-by-word basis and outputs a determination result of the part of speech of each word. For example, in FIG. 5, a mark/represents punctuation of words, and a word in parentheses < > indicates the result of determination of the part of speech of each word.

Further, based on the result of the part-of-speech analysis, the semantic attribute analysis unit 104 adds a semantic attribute to each word referring to a semantic attribute analysis knowledge database. One example of the semantic attribute analysis knowledge database is shown in FIG. 6. The semantic attribute analysis knowledge database of FIG. 6 is expressed using a regular expression. The line of 601 shows that when one or more digits are given after one or more location proper names, the description is analyzed as "<<address>>". The line of 602 shows that when "eki<noun>" is given after one or more location proper names, the description is analyzed as "<<station name>>". The lines of 603 to 606 are the same as described above. A result example obtained by processing the above part-of-speech analysis result in FIG. 5 by the semantic attribute analysis unit 104 is shown in FIG. 7.

The specific name extraction unit 105 extracts, as specific names, words having predetermined semantic attributes or parts of speech from the semantic attribute analysis result. In the present embodiment, words having the semantic attributes such as location names, store names, addresses, station names, product models, product names and personal names are extracted as specific names. One example of the specific names extracted from the above semantic attribute analysis result of FIG. 7 is shown in FIG. 8.

The above extracted specific name is registered together with the corresponding semantic attribute in the specific name storage unit 107 by the specific name management unit 106. One example of the specific names stored in the specific name storage unit 107 is shown in FIG. 9. The "FINAL DATE AND TIME" of FIG. 9 indicates the latest date and time among dates and times at which a specific name is registered or updated in the specific name storage unit 107 or dates and times at which the specific name is selected by a user through the keyword candidate presentation and selection unit 110. The "NUMBER OF SELECTIONS" of FIG. 9 indicates the number of times the specific name is selected as the keyword by a user through the keyword candidate presentation and selection unit 110.

The specific name management unit 106 manages the specific names stored in the specific name storage unit 107 in accordance with the flow of FIG. 10.

FIG. 10 is a flowchart showing the actions of the specific name management unit 106.

First, the specific name management unit 106 counts the number N of specific name extraction results (S2001). The variable i is initialized to zero (i=0), and the number of registered specific names is substituted for the number K of registrations in the specific name storage unit 107 (S2002). If i is less than N (S2003: YES), the process shifts to S2004. The specific name management unit 106 determines whether or not the i-th extraction result k[i] has been registered in the specific name storage unit 107 (S2004).

In this determination, if it is determined that k[i] has been registered in the specific name storage unit 107 (S2004: YES), the specific name management unit 106 updates the final date and time of k[i] to the current date and time in the specific name storage unit 107 (S2005). On the other hand, in the above determination, if it is determined that k[i] has not been registered in the specific name storage unit 107 (S2004: NO), the specific name management unit 106 registers k[i] in the specific name storage unit 107 (S2006), and increases the number K of registrations to K+1 (K=K+1) (S2007). Note that, upon registration of a new specific name in S2006, the final date and time is set to the current date and time, and the number of selections is set to zero.

After the process of S2005 or S2007, with the variable i increased to i+1 (i=i+1), the above process is performed for the next extraction result (returning to S2003).

If the specific name management unit 106 has performed the above process for all the N extraction results (S2003: NO), the process shifts to S2009. It is then determined whether or not the number K of registrations exceeds the maximum value M of a predefined specific name (S2009). In this determination, if it is determined that the number K of registrations is less than or equal to the maximum value M (S2009: NO), the process ends. On the other hand, in the above determination, if it is determined that the number K of registrations exceeds the maximum value M (S2009: YES), specific names registered in the specific name storage unit 107 are sorted in descending order of the number of selections (S2010). Then, specific names each having a rank of the number of selections lower than M rank are deleted in an order from the specific name whose final date and time is the oldest (S2011).

At this point, assume that when a user presses the search button 208 of FIG. 2, the keyword output instruction reception unit 109 receives a keyword output instruction given by the user.

When the keyword output instruction reception unit 109 receives a keyword output instruction, the keyword candidate classification unit 108 classifies specific names from the specific name storage unit 107 as keyword candidates based on the semantic attributes. The keyword candidate presentation and selection unit 110 presents the keyword candidates classified by the keyword candidate classification unit 108 to a user to prompt the user to select a desired keyword from the presented keyword candidates.

Figure 11:
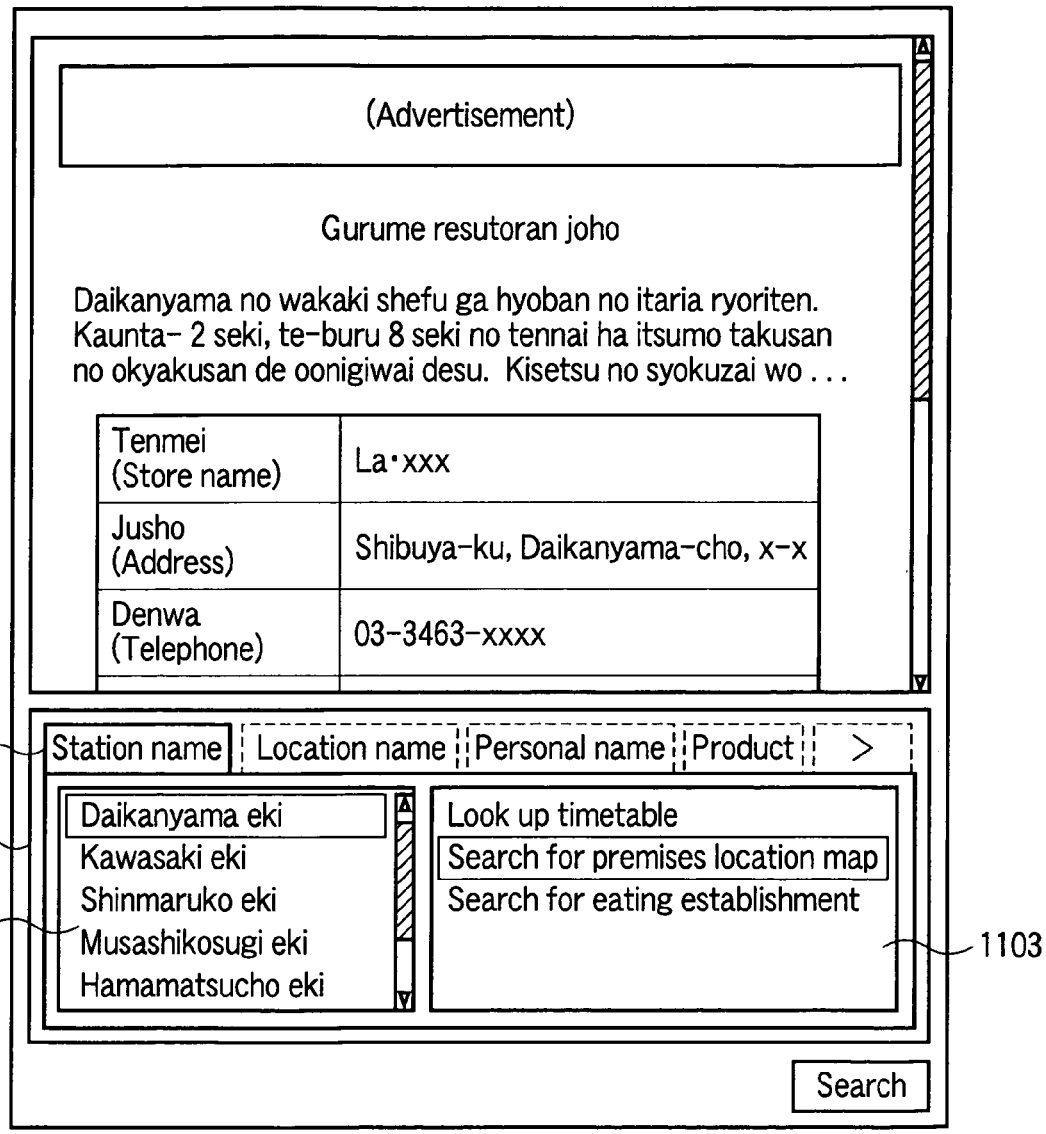
FIG. 11 shows one example of keyword candidates presented by a keyword candidate presentation and selection unit.

FIG. 11 shows a screen example on which keyword candidates are presented by the keyword candidate presentation and selection unit 110. For example, when the search button 208 is pressed in FIG. 2, the region of the document being viewed 201 of FIG. 2 is reduced upwardly for a keyword presentation region 1101 to appear. Transition to a screen as shown in FIG. 11 thus occurs. In the example of FIG. 11, the keyword candidate classification unit 108 classifies specific names stored in the specific name storage unit 107 by semantic attribute to use them as keyword candidates, and presents semantic attributes with tabs 1102. In FIG. 11, however, semantic attributes of the location name and the address are combined and presented at a "location name" tab, and semantic attributes of the product name and the product model are combined and presented at a "product" tab.

Note that the classification by the keyword candidate classification unit 108 need not be performed by semantic attribute. For example, the classification may be performed on a date-by-date basis of the final date and time or using the number of selections. In any case, the specific names stored in the specific name storage unit 107 are classified and presented as keyword candidates, facilitating selection by a user.

In the example of FIG. 11, specific names whose semantic attributes are station names are presented as keyword candidates. Specific names are sorted in reverse chronological order of the final date and time in each semantic attribute category such that specific names extracted from recently viewed documents appear in high positions. Alternatively, specific names in a semantic attribute category may be sorted and presented in decreasing order of the number of selections.

In FIG. 11, a selection cursor is first placed at a tab representing a semantic attribute, and a user can select a semantic attribute by moving the cursor right and left with cursor operation keys provided on a portable terminal. After a desired semantic attribute is selected, a desired keyword is selected from keyword candidates classified by semantic attribute by moving a cursor up and down with the cursor operation keys, and the selection of the keyword is decided by pressing a decision key provided on the portable terminal.

In the present embodiment, after a user decides selection of a keyword by input to the keyword candidate presentation and selection unit 110, a retrieval method is further selected in a retrieval method selection region 1103. Presented retrieval methods differ by semantic attribute. An example of retrieval methods is shown in FIG. 12. When a user has decided selection of a keyword in a region 1104, the selection cursor moves to the region 1103, and a retrieval method by which the user wants to perform retrieval for the selected keyword can be selected by moving the cursor up and down with the cursor operation keys.

When the retrieval method has been selected, the keyword output unit 111 outputs the selected keyword and additional keywords in accordance with the retrieval method to an external search engine or the like (not shown). Shown in FIG. 12 is an example of the output additional keywords. For example, when "Daikanyama eki" is selected as a keyword and "Search for premises location map" is selected as a retrieval method as shown in FIG. 11, "Daikanyama eki Location Map Floor Plan" are output in accordance to FIG. 12 by the keyword output unit 111.

When a keyword has been selected by a user, the keyword candidate presentation and selection unit 110 notifies the selected keyword to the specific name management unit 106. The specific name management unit 106, which has been notified of the selected keyword, updates the final date and time of the specific name, stored in the specific name storage unit 107 and corresponding to the selected keyword to the current date and time, and increments the number of selections by one.

First Modification of First Embodiment

The configuration of a first modification of the first embodiment of the present invention is the same as the configuration of the first embodiment shown in FIG. 1. However, the specific name management unit 106 initializes specific names stored in the specific name storage unit 107 every time the specific name extraction unit 105 extracts a new specific name group. That is, whenever a user views a new document, only the specific names extracted from the document being viewed are presented to the user by the keyword candidate presentation unit 110.

Second Modification of First Embodiment

The configuration of a second modification of the first embodiment of the present invention is the same as the configuration of the first embodiment shown in FIG. 1, and the units from the document acquisition unit 101 to the specific name storage unit 107 operate in the same way as in the first embodiment.

Figure 13A:
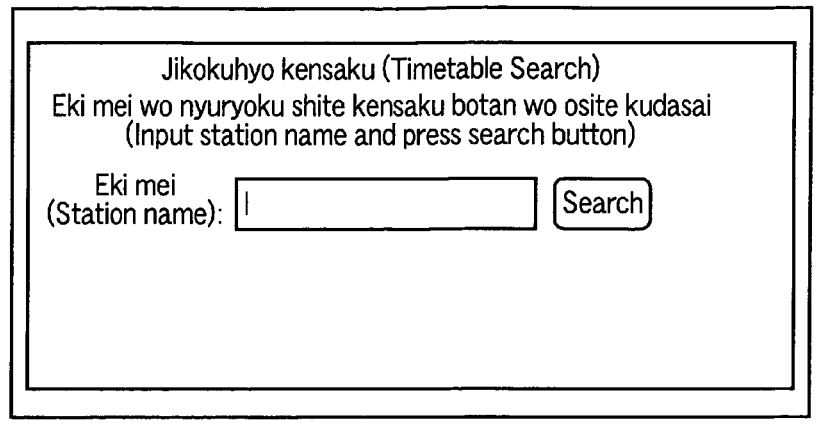
FIGS. 13A to 13C show one example of keyword output.

The keyword output instruction reception unit 109 is implemented as a hardware button (search button) on a portable terminal. For example, when a user presses a search button with a text input cursor placed in a text input form of an HTML document as shown in FIG. 13A, the keyword candidate classification unit 108 classifies specific names, which serve as keyword candidates, from the specific name storage unit 107 based on their semantic attributes in the same way as in the first embodiment, and presents the keyword candidates to a user to prompt the user to select a keyword as shown in FIG. 13B.

Figure 13B:
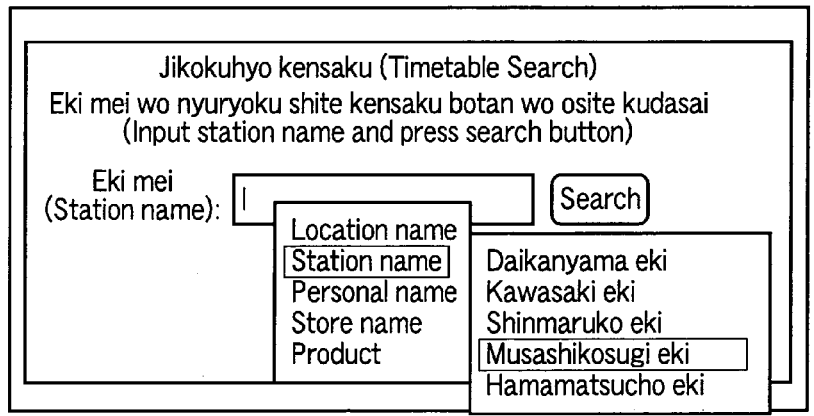
Figure 13C:
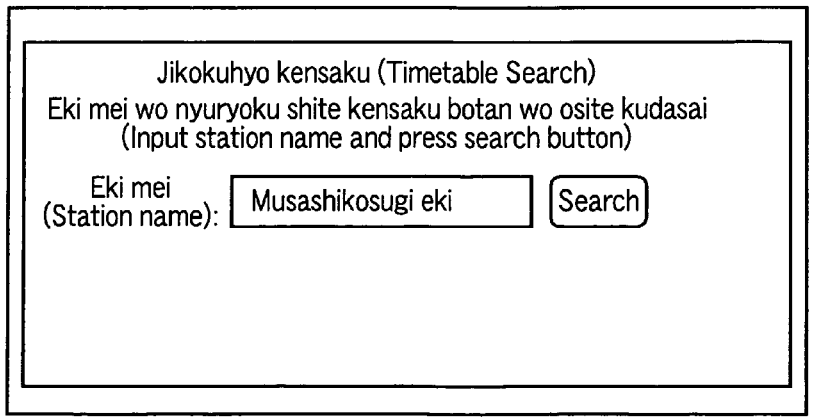

At this point, assume that, for example, a user specifies "station name" as a semantic attribute as shown in FIG. 13B, and subsequently selects "Musashikosugi eki" as a keyword from keyword candidates. This selection operation causes the keyword output unit 111 to output the selected keyword "Musashikosugi eki" as a standard output at a position of the text input cursor. Thereby, "Musashikosugi eki" is input into the text input form as shown in FIG. 13C.

As described above, according to the above first embodiment, input of a keyword can be readily performed upon information retrieval and the like by a user. That is, after specific names extracted from a document being viewed or documents viewed in the past are classified by semantic attribute, they are presented as keyword candidates to a user, and the user performs selection from the keyword candidates by key input operation with cursor operation keys and the like to enable input of a keyword in an arbitrary text input form. This enables a user to retrieve information related to a document being viewed without selecting a keyword directly with a pointing device from the document, thus enabling the user to access various information even when using a device without a pointing device, such as a cellular phone or a television set.

Second Embodiment

A second embodiment of the present invention operates in the same way as the second modification of the first embodiment. However, as shown in the configuration of FIG. 14, an input request determination unit 112 is included in addition to the first embodiment. Note that the same parts in FIG. 14 are indicated by the same reference numbers in FIG. 1, and their detailed description is omitted.

When a user instructs the keyword output instruction reception unit 109 to output a keyword, the input request determination unit 112 analyzes sentences around a text input cursor to determine classification of specific names that are to be used as keyword candidates by the keyword candidate classification unit 108.

The input request determination unit 112 determines classification of specific names to be used as keyword candidates referring, for example, to an input request determination knowledge database as shown in FIG. 15. For example, in the case of FIG. 16A, since a clue word "eki" is contained in a sentence around a text input cursor 1601, the input request determination unit 112 determines the above classification as "station name" referring to the line of 1501 in FIG. 15.

Based on the determination result of the input request determination unit 112, the keyword candidate classification unit 108 classifies, as keyword candidates, specific names whose semantic attributes are "station name" from the specific name storage unit 107. The keyword candidate presentation and selection unit 110 presents them as keyword candidates as shown in FIG. 16B.

When a user selects, for example, a keyword "Musashikosugi eki" as shown in FIG. 16B from the presented keyword candidates, the keyword output unit 111 outputs the selected keyword to the position of a text input cursor. In the example of FIGS. 16A to 16C, "Musashikosugi eki" is input in a text input form as shown in FIG. 16C.

As described above, according to the above-described second embodiment, the same effects as those in the above-described first embodiment are achieved, and further keyword candidates are presented under a classification in accordance with sentences around a cursor position in the document being viewed. In this way, a user can more readily input a keyword, enabling information retrieval to be performed immediately by simple operations.

It should be noted that this invention is not limited to the above-described embodiments. For example, in the above-described embodiments, all the functions of the keyword input supporting apparatus are provided in one device. However, the functions may be separately provided in a plurality of devices. For example, part of the functions of the keyword output instruction reception unit 109, the keyword candidate presentation and selection unit 110 and the keyword output unit 111 may be implemented in a client device, and other modules be mounted on a server device connected to the client device via a communication line. Such a configuration enables implementation of a keyword input supporting system that provides keyword candidates from a server device to a document being viewed on a client terminal, such as a portable terminal. Further, the device configuration and the processing procedure and content of each module may be modified in various ways within the scope without departing from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A keyword input supporting apparatus comprising:
a document acquisition unit which acquires a document having a plurality of components containing text data;
a main component selection unit which selects a component having characters in the text data among the components as a main component;
an analysis unit which analyzes the part-of-speech of the text data contained in the main component, and adds a semantic attribute to each of words of the analyzed text data;
an extraction unit which extracts as a specific name a word, having one of a predetermined semantic attribute and a predetermined part of speech, from each of the words;
a non-transitory storage medium which stores the specific name extracted from a document being viewed or documents viewed in the past together with a corresponding semantic attribute and selection information representing the number of times the specific name is selected as a keyword by a user;
a management unit which manages the specific name stored in the storage medium in accordance with the selection information;
a keyword candidate classification unit which performs classification of the specific name from the storage medium as a keyword candidate based on the semantic attribute and the selection information; and
a presentation unit which presents the keyword candidate to the user, and also presents a retrieval method selection region, wherein the user selects a method of key word retrieval.

2. The apparatus according to claim 1, wherein the semantic attribute contains at least one of a location name, a store name, an address, a station name, a product model, a product name and a personal name.

3. The apparatus according to claim 1, wherein the main component selection unit selects as the main component a component having punctuation marks contained in the text data.

4. The apparatus according to claim 1, wherein
the storage medium further stores, together with the specific name, final date and time information representing at least one of a date and time when the specific name is extracted from the extraction unit and a date and time when the specific name is selected as a keyword by the user, and
the keyword candidate classification unit performs classification of the specific name as the keyword candidate in accordance with the final date and time information.

5. The apparatus according to claim 1, wherein
the storage medium further stores selection information representing the number of times the specific name is selected as a keyword by the user, and
the keyword candidate classification unit performs classification of the specific name as the keyword candidate in accordance with the selection information.

6. The apparatus according to claim 1,
wherein the storage medium further stores, together with the specific name, final date and time information representing at least one of a date and time when the specific name is extracted from the extraction unit and a date and time when the specific name is selected as a keyword by the user, and the apparatus further comprises a management unit which manages the specific name stored in the storage medium in accordance with the final date and time information.

7. The apparatus according to claim 1, wherein the specific name stored in the storage medium is initialized when a specific name is extracted from a new document by the extraction unit.

8. The apparatus according to claim 1, further comprising a determination unit which determines the classification based on a cursor position in the document being viewed.

9. The apparatus according to claim 1, wherein the storage medium is a writable and readable memory or a hard disk.

10. The apparatus according to claim 1, wherein the key word selection region provides the user a choice of method of key word retrieval selected from the group consisting of searching for the key word in a timetable, a location map, a profile of a person, and information concerning an eating establishment.

11. The apparatus according to claim 1, wherein the main component selection unit selects a main component to be other than advertisements.

12. A keyword input supporting method comprising:
acquiring a document having a plurality of components containing text data;
selecting a component having characters in the text data among the components as a main component;
analyzing the part-of-speech of the text data contained in the main component, and adding a semantic attribute to each of words of the analyzed text data;
extracting as a specific name a word, having one of a predetermined semantic attribute and a predetermined part of speech, from each of the words;
storing the specific name extracted from a document being viewed or documents viewed in the past together with a corresponding semantic attribute and selection information representing the number of times the specific name is selected as a keyword by a user;
managing the specific name stored in the storage unit in accordance with the selection information;
performing classification of the stored specific name as a keyword candidate based on the semantic attribute and the selection information;
presenting the keyword candidate to the user, and
presenting a retrieval method selection region, from which the user selects a method of key word retrieval.

13. A non-transitory computer-readable medium storing instructions that, when executed by the computer, cause the computer to perform:
acquiring a document having a plurality of components containing text data;
selecting a component having characters in the text data among the components as a main component;
analyzing the part-of-speech of the text data contained in the main component, and adding a semantic attribute to each of words of the analyzed text data;
extracting as a specific name a word, having one of a predetermined semantic attribute and a predetermined part of speech, from each of the words;
storing the specific name extracted from a document being viewed or documents viewed in the past together with a corresponding semantic attribute and selection information representing the number of times the specific name is selected as a keyword by a user;
managing the specific name stored in the storage unit in accordance with the selection information;
performing classification of the stored specific name as a keyword candidate based on the semantic attribute and the selection information;
presenting the keyword candidate to the user; and
presenting a retrieval method selection region, from which the user selects a method of key word retrieval.

* * * * *